M. LEHMAN, L. BROWN & E. W. SOHLBERG.
RACING AMUSEMENT APPARATUS.
APPLICATION FILED SEPT. 24, 1906.
912,004.
Patented Feb. 9, 1909.
7 SHEETS—SHEET 1.
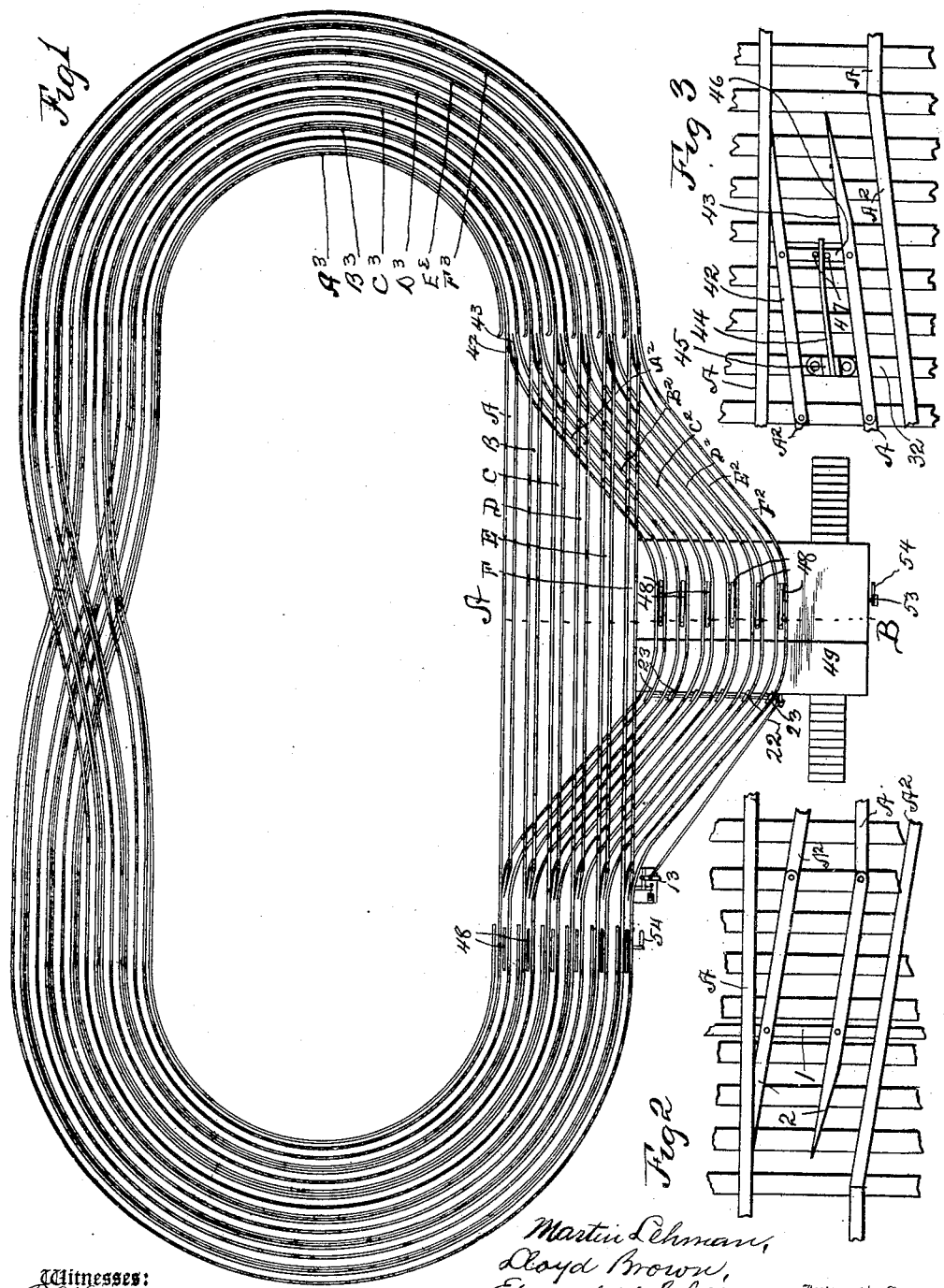

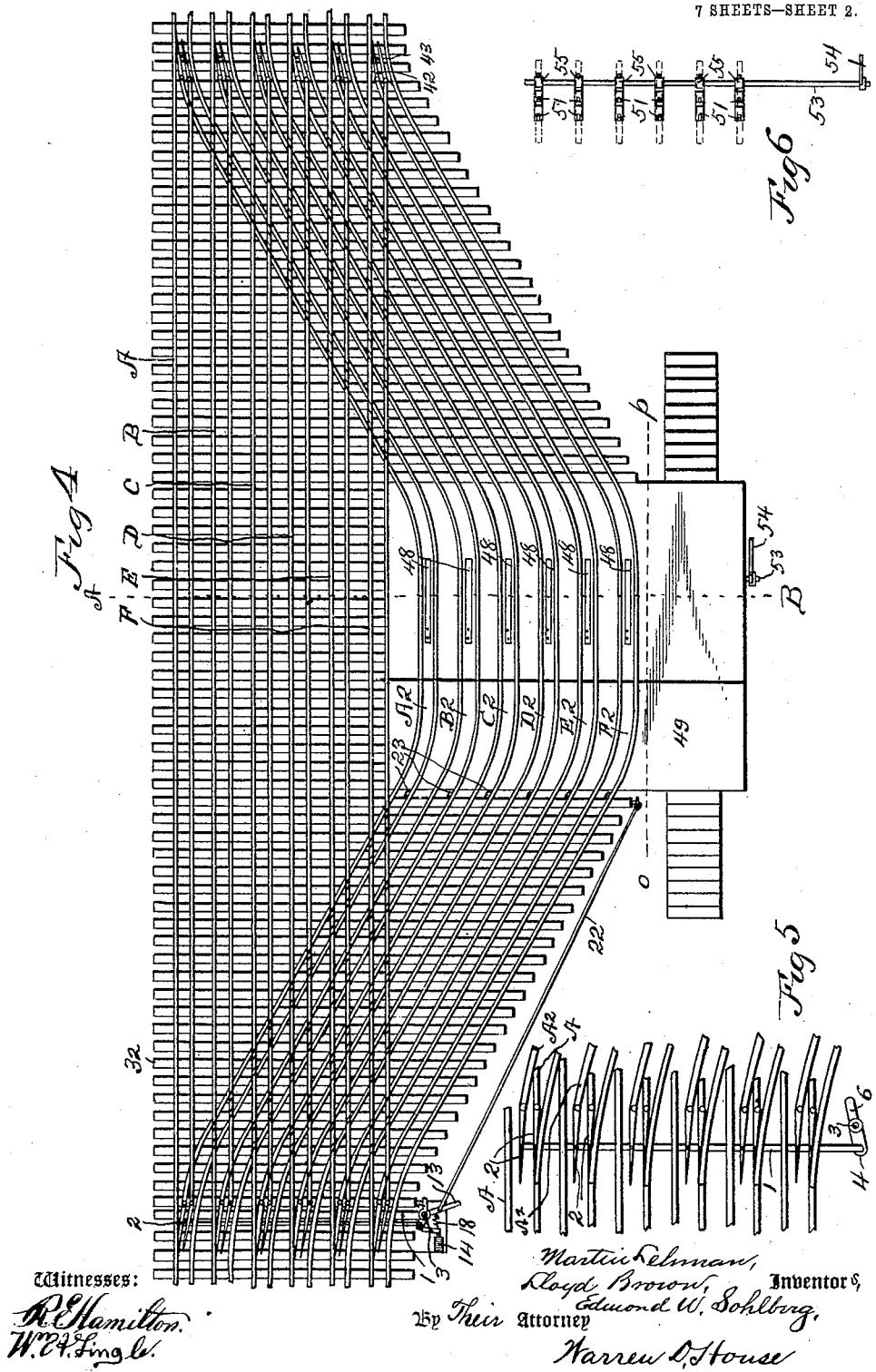

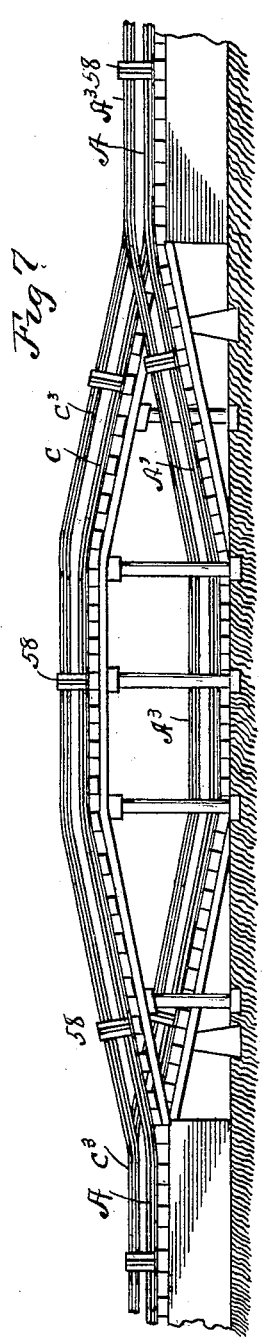
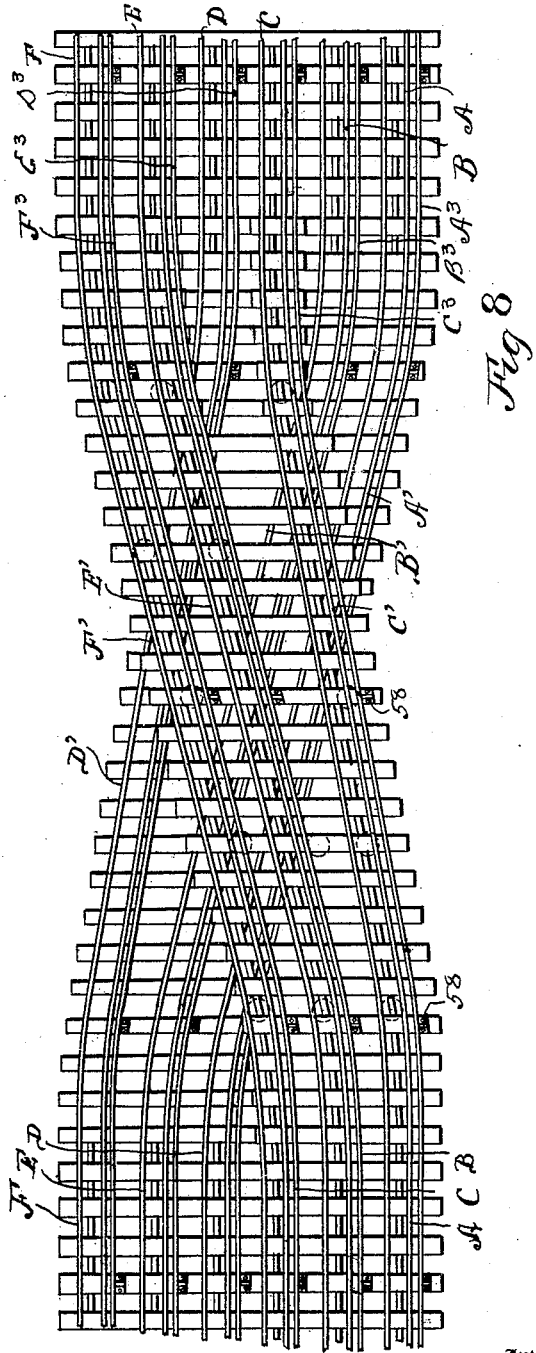

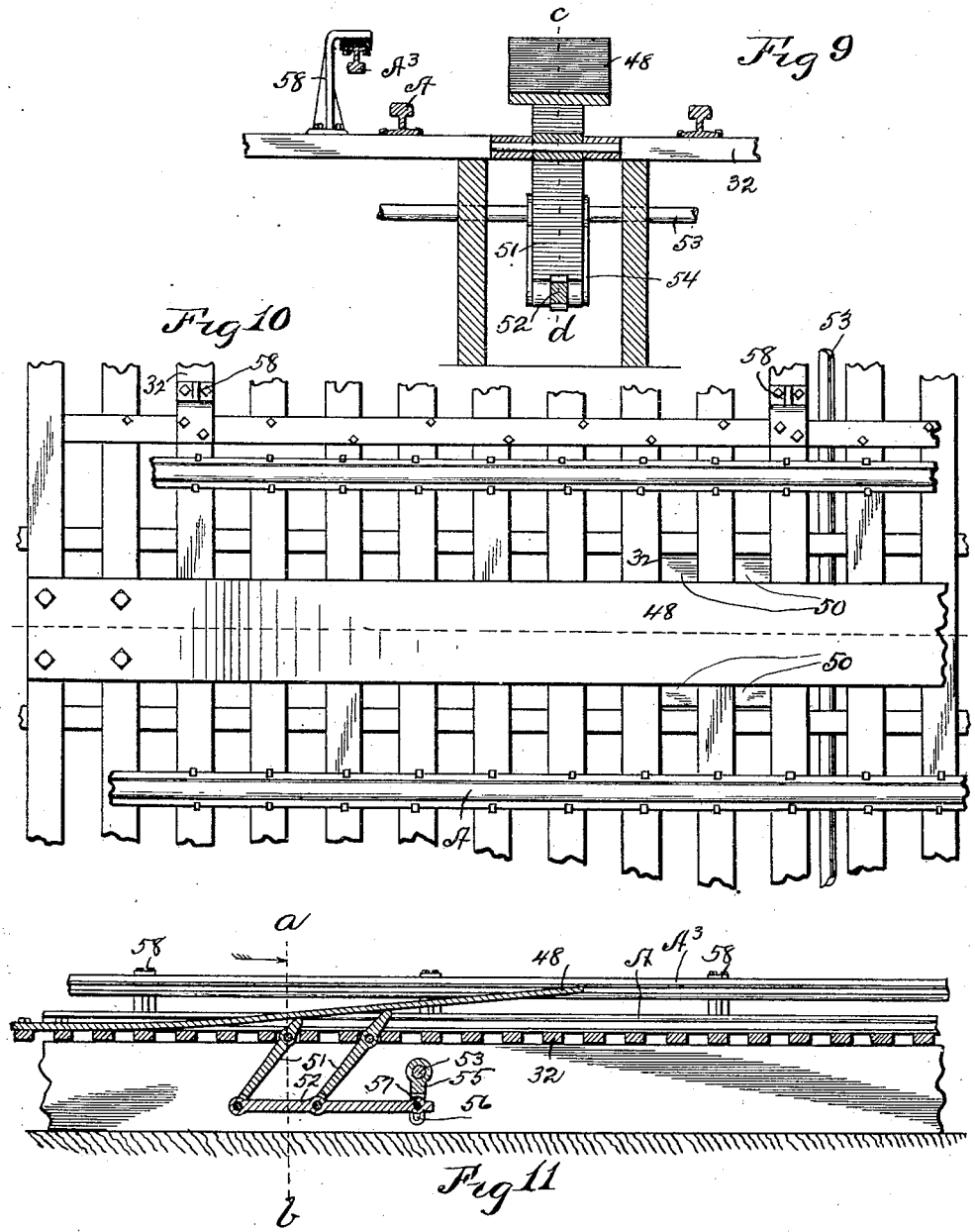

M. LEHMAN, L. BROWN & E. W. SOHLBERG.
RACING AMUSEMENT APPARATUS.
APPLICATION FILED SEPT. 24, 1906.
912,004.
Patented Feb. 9, 1909.
7 SHEETS—SHEET 5.
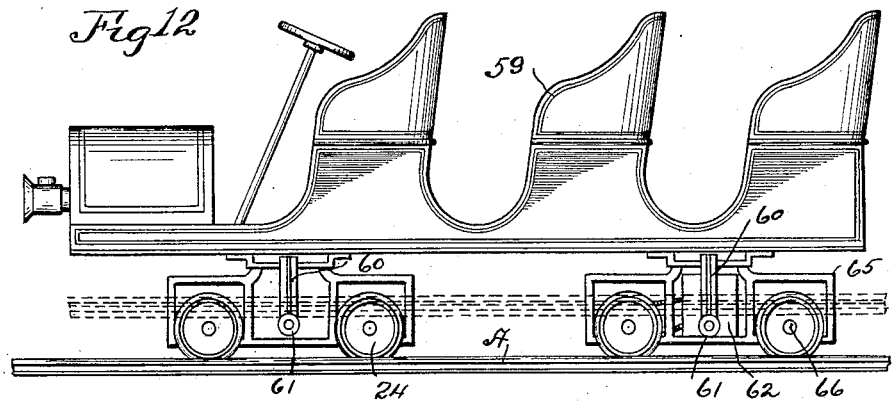
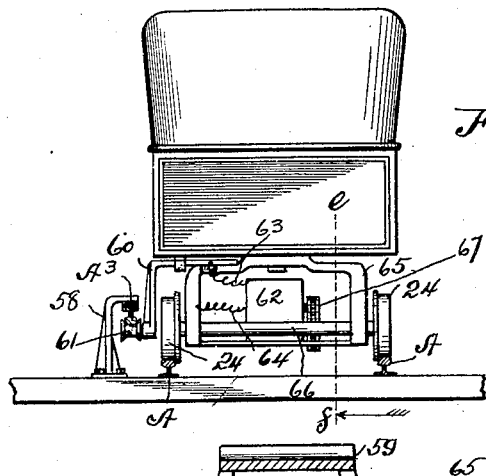
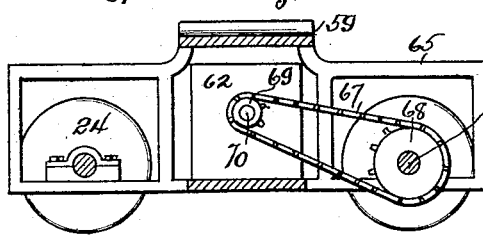

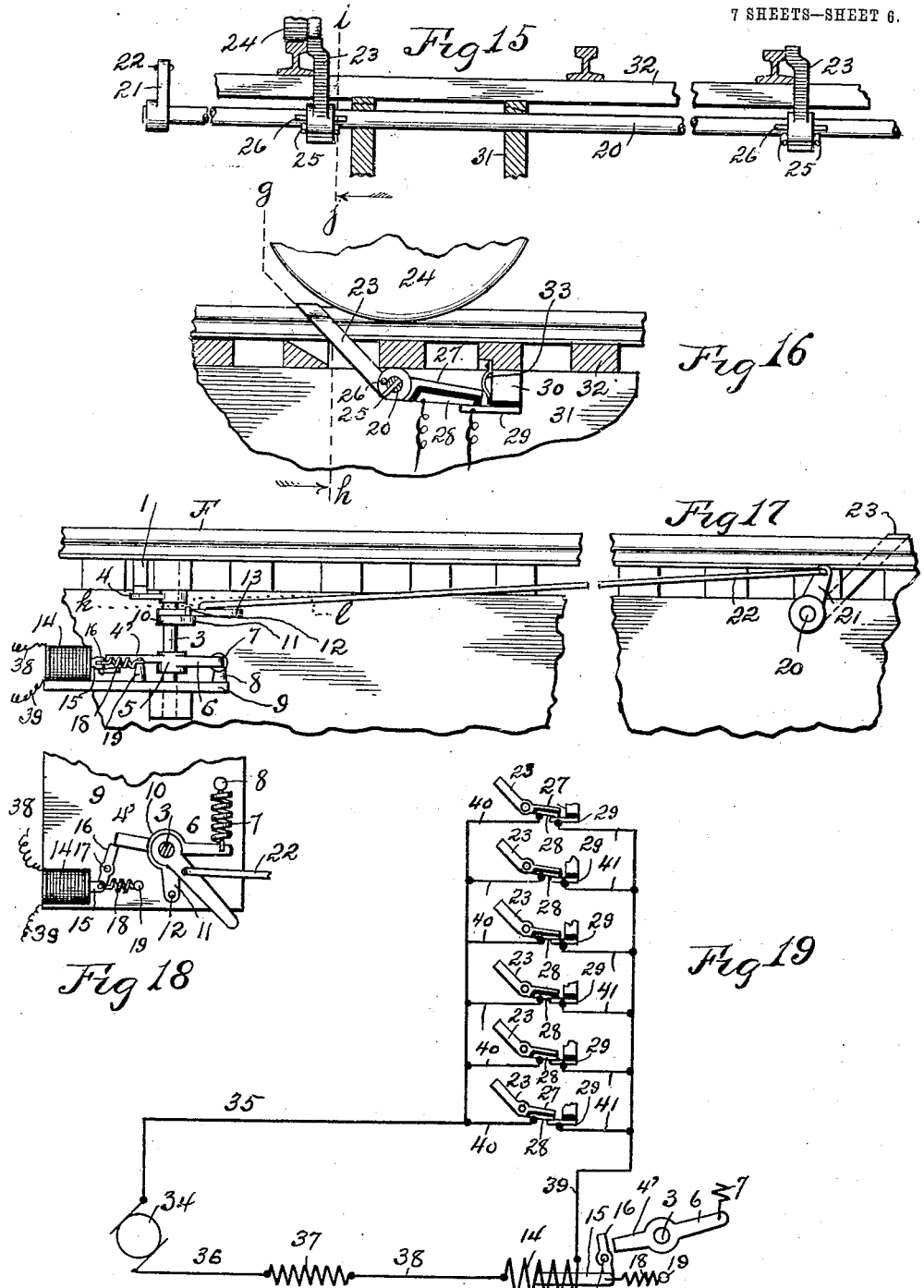

M. LEHMAN, L. BROWN & E. W. SOHLBERG.
RACING AMUSEMENT APPARATUS.
APPLICATION FILED SEPT. 24, 1906.
912,004.
Patented Feb. 9, 1909.
7 SHEETS—SHEET 7.
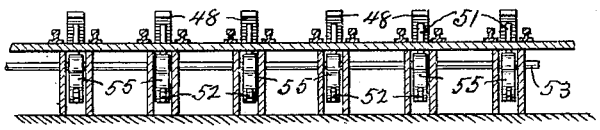
Fig 20
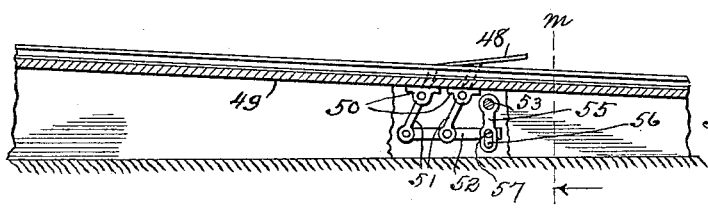
Fig. 21
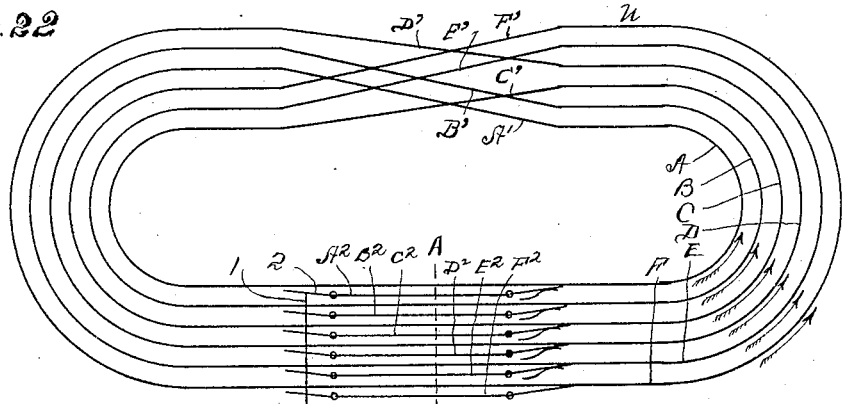
Fig. 22
Fig. 23
Fig. 24
| Start | 1st Round | 2nd Round | 3rd Round | 4th Round |
|---|---|---|---|---|
| A | D | F | C | A |
| B | E | B | E | B |
| C | A | D | F | C |
| D | F | C | A | D |
| E | B | E | B | E |
| F | C | A | D | F |
Witnesses:
R. E. Hamilton
E. B. House
Inventors,
Martin Lehman
Lloyd Brown
Edward W. Sohlberg
By Their Attorney
Warren O. House

UNITED STATES PATENT OFFICE.

MARTIN LEHMAN, LLOYD BROWN, AND EDMOND W. SOHLBERG, OF KANSAS CITY, MISSOURI.

RACING AMUSEMENT APPARATUS.

No. 912,004.     Specification of Letters Patent.     Patented Feb. 9, 1909.

Application filed September 24, 1906. Serial No. 335,976.

*To all whom it may concern:*

Be it known that we, MARTIN LEHMAN, LLOYD BROWN, and EDMOND W. SOHLBERG, citizens of the United States, residing at Kansas City, in the county of Jackson and State of Missouri, have invented certain new and useful Improvements in Racing Amusement Apparatus, of which the following is a specification.

Our invention relates to improvements in racing amusement apparatus.

The object of our invention is to provide an amusement apparatus in which a plurality of motor vehicles, preferably adapted to carry people, may be employed to race with each other on tracks provided therefor, the novel features of which are hereinafter fully described and claimed.

Our invention provides further, a novel racing course comprising an endless track formed in a plurality of loops which cross each other and are disposed for a part parallel with each other, whereby a plurality of vehicles in running around the loops of the track will all travel the same distance.

Our invention provides further, side tracks connected respectively by switching means to the loops of the endless track.

Our invention provides further, a novel mechanism by which, when a vehicle is passing from a main track to a side track it will actuate the switching means to disconnect the side from the main track.

Our invention provides still further, novel means by which the vehicles may be automatically started and stopped at the starting line of the race course.

Other novel features of our invention are hereinafter described and claimed.

In the accompanying drawings illustrative of our invention—Figure 1 is a plan view of the race course showing the main and side tracks and mechanism connected therewith. Figs. 2 and 3 represent respectively, plan views of two of the switch mechanisms connected respectively with the inlet and outlet ends of one of the side tracks. Fig. 4 is a plan view showing enlarged, the side tracks and mechanisms connected therewith. Fig. 5 is a plan view of a portion of the switch mechanism at the inlet end of the side tracks. Fig. 6 is a plan view of the mechanism for operating the track brakes. Fig. 7 and Fig. 8 are respectively side elevation and plan views of the transverse or connecting portions of the main tracks. Fig. 9 is a vertical, transverse sectional view taken on the dotted line *a—b* of Fig. 11. Fig. 10 is a plan view of a portion of one of the main tracks and track brake located thereon. Fig. 11 is a longitudinal, vertical sectional view taken on the dotted line *c—d* of Fig. 9. Fig. 12 is a side elevation of one of the motor vehicles on the main track, the third rail conductor being shown in dotted lines. Fig. 13 is a vertical cross section through one of the main tracks and trolley rails and showing, in rear elevation, one of the motor vehicles on the track. Fig. 14 is a vertical sectional view taken on the dotted line *e—f* of Fig. 13. Fig. 15 is a vertical cross section through a portion of the side tracks, and showing a part of the mechanism for making and breaking the circuits which control the switching mechanism, the view being taken on the broken dotted line *g—h* of Fig. 16. Fig. 16 is a vertical sectional view taken on the dotted line *i—j* of Fig. 15. Fig. 17 is a side elevation view of a portion of the automatic switch operating mechanism, portions of which are shown in Figs. 15, 16 and 18. Fig. 18 is a horizontal sectional view taken on the dotted line *k—l* of Fig. 17. Fig. 19 is a diagrammatic view of the circuits in which are located the automatic switch controlling devices. Fig. 20 is a transverse vertical sectional view, taken on the dotted line *m—n* of Fig. 21, and showing portions of the track braking mechanism connected with the side tracks. Fig. 21 is a vertical sectional view, partly broken away, taken on the dotted line *o—p* of Fig. 4. Fig. 22 is a diagrammatic view of the main and side tracks, each track for clearness, being represented by a single line. Fig. 23 is a diagrammatic view of the circuits in which are located the motor vehicles, the third or conducting rails being represented in the form in which they are employed in connection with the tracks shown in Fig. 22. Fig. 24 is a schedule showing the courses run by the motor vehicles in making four rounds.

Similar characters of reference denote similar parts.

The track construction will now be described:—Referring particularly to Figs. 1 to 8 inclusive, A, B, C, D and F denote a plurality of elliptical, concentrically disposed portions of the tracks. One set of ends of the portions A, B, D are connected respectively by transverse portions A' B' and D' with the opposite ends of the portions D, E and F respectively. The other ends of the tracks A and B and the adjacent end of the portion C are connected respectively by track portions C', E' and F', with the opposite ends of the track portions C, E and F respectively. The transverse portions A', B' and D' pass under the transverse portions C', E' and F', as shown in Figs. 7 and 8. It will be seen by observation of Fig. 22, that the six concentric, elliptical portions and their transverse connecting portions comprise two endless tracks, each comprising a plurality of loops which cross each other. An observation of the schedule in Fig. 24 will show that vehicles starting respectively on the portions A, C, D and F, at the transverse starting line A—B, in making four rounds will all pass over an endless track comprising the portions A, D, F, and C and the connecting portions A', C', D', and F', and each vehicle will finish at the starting line A—B on the same portion of the track on which it started. Further observation of the schedule will show that the two cars starting at the line A—B on the portions B and E respectively, will both pass over a single endless track formed by the portions B and E, and the transverse connecting portions B' and E', each car finishing on the same portion on which it started after mixing four rounds. The concentric portions A, B, C, D, E and F, are located equal distances apart, the portion B being intermediate A and C, and the portion E, intermediate the portions D and F. By means of this arrangement all the vehicles will, in making four rounds, travel the same distance.

Referring to Figs. 1 to 5, inclusive, and to Fig. 22, $A^2$, $B^2$, $C^2$, $D^2$, $E^2$ and $F^2$, denote six side tracks connected at their ends by suitable switches to the portions A, B, C, D, E and F. These side tracks cross the starting line A—B at one side of the main tracks. The left ends of the side tracks, as viewed in Fig. 4, are connected with the main tracks respectively by switches which are manually operated to make such connections, the switches being automatically operated, as hereinafter described, to disconnect the side from the main tracks.

Referring particularly to Figs. 1 to 5 inclusive, and to Figs. 17 and 18, 1 denotes a horizontal, transverse bar slidably mounted under the rails of the track portions, A, B, C, D, E and F, adjacent the left ends of the side tracks as viewed in Fig. 4. 2 denotes each of a plurality of pairs of switch tongues, each tongue pivotally connected to the bar 1, one tongue of each pair being pivoted at one end to the adjacent end of one rail of the adjacent side track, the other tongue of the pair being pivoted to the end of a rail in the adjacent main track, at which point a gap is provided in the main rail adapted to be closed by the tongue pivoted to the main track rail. The other rail of the side track is made continuous with the rail in the main track provided with the gap which is closed by the switch tongue 2 connected with the main track. The tongues 2 are so disposed that by reciprocating the bar 1 the side tracks may be alternately connected with and disconnected from the main tracks respectively, thereby permitting the vehicles to be shunted on to the side tracks or permitting them to make as many rounds as desired on the main tracks.

The mechanism for shifting the bar 1 will now be described:—Referring particularly to Figs. 17 and 18, 3 denotes a vertical rock shaft, mounted in suitable bearings and having secured rigidly to it a horizontal crank arm 4, pivotally connected to the bar 1. Rigidly secured to the shaft 3 is a horizontal plate 5, having two horizontal crank arms, 4' and 6, which project in opposite directions. A coil spring 7 is connected at one end to the crank arm 6, the other end being connected to a vertical pin 8 projecting upwardly from a suitably supported horizontal plate 9. The tension of the spring 7 is such that it will normally rock the shaft 6 in a direction such that the bar 1 will be swung to the position shown in Fig. 5, in which position the side tracks will be disconnected at their inlet ends from the main tracks. Rigidly mounted on the shaft 3 is a horizontal plate 10 having a horizontal arm 11 from which upwardly extends a vertical pin 12. Loosely pivoted on the shaft 3 above the plate 10, is a hand lever 13, positioned, as viewed in Fig. 18, to the right of the pin 12. To connect the side with the main tracks the lever 13 is swung so as to strike the pin 12 and rock the arm 11 and shaft 3 to the position shown in Fig. 18. The inlet ends of the side tracks will be now connected with the main tracks respectively, as shown in Figs. 1 and 4. To lock the switch tongues 2 in the position just described, a releasable locking mechanism is provided, comprising the following described parts:—A horizontal solenoid is secured on the upper side of the plate 9, the solenoid having a coil 14 energized in the manner hereinafter described. In the helix or coil 14 is a horizontally slidable core 15, to the outer end of which is pivoted one end of a lever 16, pivotally mounted on a vertical pin 17, the lower end of which is secured to the plate 9. A coil spring 18 has one end secured to the core 15, the other end being secured to a vertical pin 19, mounted on the plate 9. The tension of the spring 18 is such that when the coil 14 is deënergized the spring will retract the core 15 and swing the lever 16 clear of the arm 4', after which the spring 7 will rock the shaft 3 so as to move the bar 1 to the position shown in Fig. 5, thus disconnecting the inlet ends of the side tracks from the main tracks. As long as the helix or coil 14 is energized the core 15 will be drawn into the helix and will hold the lever 16 in position such that when the shaft 3 is swung by the lever 13, as hereinbefore described, the lever 16 will engage the arm 4' and prevent the spring 7 from rocking the shaft 3.

Now follows a description of the circuit making and breaking devices which control the energizing of the helix 14:—Referring to Figs. 15 to 19 inclusive, and also to Fig. 4, 20 denotes a horizontal rock shaft extending transversely below the rails of the side tracks and adjacent the middle portions thereof. On one end of the rock shaft 20 is rigidly secured a crank arm 21 to which is pivotally connected one end of a rod 22, the other end of which is pivotally connected to the lever 13. Loosely pivoted to the rock shaft 20 at their angles, are a plurality of bell crank levers, the arms 23 of which are disposed respectively between the rails of the side tracks, each arm being disposed so that the flange of a wheel on the motor vehicle running on the adjacent side track will depress said arm. At opposite sides of each bell crank lever, in the shaft 20, are provided two transversely projecting pins 25, adapted to strike and be struck by a horizontal pin 26 extending transversely through the adjacent arm 23. The other arm 27 of each bell crank lever has secured to its under side, but electrically insulated therefrom, a contact plate 28, adapted, when the lever is swung to the position shown in Fig. 16, to strike a contact plate 29, secured to but insulated from a lug 30 mounted on the side of one of a plurality of horizontal timbers 31 which support the ties 32 on which the track rails are mounted. A flat spring 33, is secured on each lug 30 and is so formed that it will strike the outer end of the adjacent arm 27 and releasably hold the said arm in the position shown in Fig. 16, in which position the contacts 28 and 29 will be together, or hold the said arm in the position in which it will be swung by the car wheel striking the arm 22. It will be understood that there are provided a number of springs 33, lugs 30 and contacts 28 and 29 corresponding in number to the number of bell crank levers.

Referring to Fig. 19, for a description of the circuits having included the mechanism controlling the operation of the switch operating mechanism, 34 denotes an electric generator, such as a dynamo, one brush of which is connected with a conductor 35, the other brush being connected with a conductor 36, connected to one terminal of a resistance coil, the other terminal of which is connected to a conductor 38, connected to one end of the helix 14, the other end of which is connected to a conductor 39. The contact plates 28 are connected respectively by a plurality of conductors 40 with the conductor 35. The contact plates 29 are connected respectively by means of a plurality of conductors 41 with the conductor 39. As will be seen by reference to Fig. 19, the circuit making and breaking devices are connected in multiple with the conductors 35 and 39, and that when any one pair of contacts 28 and 29 are in contact with each other the circuit in which are included the dynamo 34 and helix 14 will be completed through such pair of contacts and that when all of said pairs of contacts are connected the circuit will be completed through each pair, and the helix 14 will be energized, thus holding the lever 16 in position to engage and hold the arm 4' of the plate 5.

Referring to Figs. 1, 3 and 4, 42 and 43 denote two parallel tongues of a plurality of pairs, disposed adjacent the outlet ends of the side tracks A², B², C², D², E² and F². Each pair of switch tongue mechanisms is constructed similarly to the adjacent other pairs. Referring particularly to Fig. 3, the tongues 42 and 43 are pivoted respectively at one set of ends to one end of one side track rail and to one end of a main track rail in a manner similar to that already described with reference to the switch tongues at the inlet ends of the side tracks. The disposition of the tongues 42 and 43 is such that when the tongue 42 connects with the adjacent main track rail the tongue 43 will clear the other main track rail. To retain the tongues normally in this position so that the vehicles may run from the side to the main track and yet permit the vehicles to freely run around the main tracks when they are not to be side-tracked, resilient means are employed to retain the tongues 42 and 43 in the positions shown in Fig. 3. A plurality of flat spring bars 44 are secured at one set of ends respectively to a plurality of plates 45 secured intermediate respectively the switch tongues of the different pairs, to the ties 32. A plurality of horizontal plates 46, are connected each in a pivotal manner to the tongues 42 and 43 of a pair. Upwardly extending from each plate 46 are two pins 47, between which is located the free end of the adjacent spring bar 44. The tension of the spring bars 44 is such that the tongues 42 and 43 are normally swung to the position shown in Fig. 3.

Two sets of track brakes are employed, one set to slacken the speed of the vehicles prior to their entering the side track and the other set for stopping the vehicles on the side tracks at the starting line A—B. Each set of track brakes are constructed in a like manner so that a description of one set will answer for both. Each set of track brakes is provided with a plurality of normally disposed horizontal planks 48, disposed lengthwise respectively, between the rails of each track. These planks are secured each firmly at one end to any suitable support, such as the cross ties 32 in the main track and to the platform 49 which support the middle portion of the side tracks. Means are provided in each set of track brakes for simultaneously swinging upward the free ends of the planks 48 so that they will bear upon the under sides of the motor vehicles respectively and by their friction will stop the vehicles or slacken their speed, depending upon the pressure applied to them.

Pivotally supported in suitable bearings 50, secured, in the side track set of brakes, to the under side of the platform 49, are a plurality of pairs of parallel upwardly extending levers 51, disposed one pair between the rails of each track and directly under the adjacent plank 48, the upper ends of the levers bearing against the under side of the plank 48. A plurality of horizontal bars 52 are pivoted each to the lower ends of a pair of levers 51. Transversely extending horizontally under the side track rails and in suitable bearings, is mounted a rock shaft 53 having at one end a crank arm 54 by which the shaft is rocked to set the brakes. Rigidly mounted on the shaft 53 are a plurality of crank arms 55, in each of which is provided a slot 56 having mounted therein a horizontal pin 57, rigidly secured to the end of the adjacent bar 52. Thus each bar 52 is adapted to be swung, when the rock shaft 53 is rocked.

In order that the motor vehicles may start from the starting line A—B by gravity, that portion of the platform 49 in which are located the planks 48, is inclined downwardly toward the outlet ends of the side tracks so that when the shaft 53 is rocked in the proper direction the planks 48 will be lowered and released from the vehicles, permitting the vehicles to run by gravity on to the main tracks.

The following is a description of the circuits over which travel the currents which propel the motor vehicles:—Referring particularly to Figs. 1, 7, 8, 9, 10, 11, and 23, $A^3$, $B^3$, $C^3$, $D^3$, $E^3$, and $F^3$, denote a plurality of electric conductors comprising what we term "third" rails and supported by but insulated from the underside of the horizontal arms of right-angled brackets 58, the lower ends of the vertical portions of which are secured to the cross ties 32. The said conductors are disposed parallel respectively with the courses taken by the motor vehicles on their first round of the tracks, beginning where are located the switch tongues 42 and following the main tracks to where are located the switch tongues 2. For example, conductor $A^3$ parallels the track A from adjacent the switch tongue 42 to the transverse portion A' which it parallels, to the track D, thence following the track D to a point adjacent the switch tongue 2, where it terminates. In a like manner, the conductor $B^3$ parallels the course including the track B, transverse portion B' and track E. Intermediate the ends of the conductors the motor vehicles run on the main and side tracks by their momentum. The third rails or conductors $A^3$, $B^3$, $C^3$, $D^3$, $E^3$ and $F^3$ are placed along the inner side of the tracks which they parallel, thereby serving to prevent the cars tipping outward by centrifugal force as the cars round the curves at rapid speed.

59 denote one of a plurality of motor vehicles all of which are alike in construction. Each motor vehicle has secured to its under side the horizontal portion of a right-angled bracket 60 to the vertical portion of which is secured a rotary contact wheel 61 adapted to bear against the under side of the third rail which it follows. Each motor vehicle carries an electric motor of any suitable type connected in series by conductors 63 and 64 to the trolley bracket 60 and the framework of the car. Any suitable means for driving the motor vehicle may be employed. In the drawings is shown one of ordinary construction in which a sprocket chain 67 is connected respectively with sprocket wheels 68 and 69 secured respectively on the axle 66 and the armature shaft 70 of the motor 62. The vehicle frame to which the conductor 64 is connected and which is supported by the axles 66 is denoted by 65.

Referring to Fig. 23, 71 denotes a generator, such as a dynamo, one brush of which is connected by a conductor 72 with the track portions A, B, C, D, E, and F. The other brush is connected by a conductor 73 with a movable contact 74 forming a part of a rheostat having a coil 75, one end of which is connected to a conductor 76. The movable contact 74 is arranged so as to connect successively with the different turns of the coil 75. A plurality of jars 77 contain each a conducting material such as acidulated water. A plurality of electrodes 78 are located one in each jar 77. A plurality of conductors are connected respectively with the electrodes 78 and to the conductor 76. A plurality of vertically movable electrodes are located one in each jar 77 in the acidulated water contained therein. A plurality of conductors 81 are connected respectively to the electrodes 80 and to the conductors $A^3$, $B^3$, $C^3$, $D^3$, $E^3$, and $F^3$. The jars 77, together with the electrodes 78 and 80 and the liquid contained in the jars form resistance varying devices by which the currents supplied to the different motor vehicles may be varied for varying independently the speed of said vehicles. In an accompanying application filed of even date herewith, we have described means for vertically reciprocating the electrode 80 for this purpose.

In operating the invention the motor vehicles are all disposed on the side tracks at the starting line A—B. The lever 54 is then swung so as to lower the planks 48 after which the cars will run by gravity on to the main tracks at which time the trolley wheels 61 will run respectively in contact with the third rails $A^3$, $B^3$, $C^3$, $D^3$, $E^3$, and $F^3$, after which the contact 74 of the rheostat is moved so as to gradually throw into circuit the dynamo 71. The motor vehicles will now be propelled by the currents passing through the circuits in which are located the motors of said vehicles. After the vehicles have made three rounds and are about to complete the fourth round, before they reach the inlet ends of the side tracks the lever 13 is swung so as to slide bar 1 to the position shown in Figs. 1 and 4, thus connecting the side tracks with the main tracks respectively. When the lever 13 is so moved the shaft 20 will be rocked by means of the rod 22 and crank arm 21 so that the pins 25 will strike the pins 26 and force the arms 23 to the position shown in Fig. 16. As each car passes on its side track the wheel flange will depress the adjacent arm 23, thus separating the contacts 28 adjacent thereto. When the last car enters its side track the last pair of contacts 28 and 29 will be separated and the circuit in which is located the helix 14 will thus be broken. The spring 18 will then retract the core 15 releasing the arm 4' from the lever 16 after which the spring 7 will rock the shaft 3 so as to move the bar 1 to the position shown in Fig. 5 and disconnecting the side from the main tracks. Prior to this time the lever 54 of the shaft 53 under the side track will be swung so as to bring the adjacent planks 48 in position to engage the vehicles as they reach the starting line A—B.

Having thus described our invention, what we claim and desire to secure by Letters Patent, is:—

1. The combination with a plurality of main tracks, of a plurality of side tracks, switching means for connecting the side and main tracks respectively, vehicles adapted to run one on each main track and from thence upon the side track connected thereto, and means by which when all the vehicles have passed to certain positions on the side tracks the switching means will be operated to disconnect the side from the main tracks.

2. The combination with a plurality of main tracks, of a plurality of side tracks, switching means manually operated for connecting the side with the main tracks respectively, vehicles adapted to run on the main and side tracks, and means by which when all the vehicles have passed from the main to the side tracks the switching means will be operated to disconnect the side from the main tracks.

3. The combination with a main track, of a side track, a conductor parallel with the main track, a vehicle on the main track, a motor carried by said vehicle, means carried by the vehicle for placing the motor in circuit with the conductor, a switching means manually operated to connect the side and main tracks, and means actuated by the vehicle running from the main onto the side track for operating the switching mechanism to disconnect the tracks.

4. The combination with a plurality of main tracks, of a plurality of side tracks adapted to be connected respectively with the main tracks, conductors disposed parallel with said main tracks respectively, vehicles adapted to run on said main tracks, motors carried one on each vehicle, means carried by each vehicle for placing said motors in circuit respectively with the conductors adjacent thereto, switching means for connecting the side and main tracks respectively, and means actuated when all of the vehicles have passed from the main to the side tracks for operating the switching means to disconnect the main from the side tracks.

5. The combination with the main track, of a side track, switching means for connecting the tracks, means for normally operating said switching means to disconnect the two tracks, and electro magnetically operated means controlled by a vehicle passing on the side track for releasably locking said switch operating means.

6. The combination with the main track, of a side track, switching means for connecting the tracks, means for normally operating said switching means to disconnect the tracks, locking means for preventing the operation of said switch operating means, means for moving said locking means to the release position, and electro-magnetic means controlled by the passage of a vehicle on the side track for moving said locking means to the locked position.

7. The combination with the main tracks, of the side tracks, switching means for respectively connecting the main and side tracks, means for normally operating the switching means to disconnect the tracks, and electro-magnetically controlled means for releasably rocking the switch operating means against operation, said electro-magnetically controlled means being operated to release the switch operating means by a vehicle running over one of the side tracks.

8. The combination with the main tracks, of the side tracks, switching means for connecting respectively the side and main tracks, means for normally operating the switching means to disconnect the side and main tracks, and electro magnetic means for locking the switch operating means against operation until a vehicle has passed over each side track to a certain position thereon.

9. The combination with a switch bar, of means for moving said bar in one direction, means for normally retracting said bar in the opposite direction, locking means for restraining the operation of said retracting means, a helix located in an electric circuit, means actuated by said helix when energized for controlling said locking means, means located in said circuit for energizing said helix, circuit making and breaking means located in said circuit, and means actuated by a moving vehicle for operating said circuit making and breaking means.

10. The combination with a switch bar, of means for moving said bar in one direction, means for normally retracting said bar in the other direction, locking means for restraining the operation of said retracting means, a helix located in an electric circuit, means actuated by said helix for controlling said locking means, means located in said circuit for energizing said helix, a plurality of circuit making and breaking devices disposed in multiple order in said circuit, and a plurality of means actuated respectively by moving vehicles for respectively operating said circuit making and breaking devices.

11. The combination with a switch bar, of means for moving the bar in one direction, means for retracting the bar in the other direction, a locking device for restraining the operation of said retracting means, a magnetizable member which when moved operates the said locking device, a helix located in an electric circuit for moving said magnetizable member in one direction, means for moving said magnetizable member in the opposite direction, means for generating a current in said circuit, and circuit making and breaking means located in said circuit and actuated by a moving vehicle.

In testimony whereof we affix our signatures in presence of two witnesses.

MARTIN LEHMAN.
LLOYD BROWN.
EDMOND W. SOHLBERG.

Witnesses:
E. B. HOUSE,
WILL R. WINCH.